SOLID STATE IMAGE INTENSIFIER

Filed April 12, 1957 2 Sheets-Sheet 1

INVENTOR
JOHANNES GERRIT VAN SANTEN
GESINUS DIEMER

BY Frank R. Jufani
AGENT

SOLID STATE IMAGE INTENSIFIER

Filed April 12, 1957 2 Sheets-Sheet 2

INVENTOR
JOHANNES GERRIT VAN SANTEN
GESINUS DIEMER
BY Frank R. Jifari
AGENT 2,948,816

SOLID STATE IMAGE INTENSIFIER

Johannes Gerrit van Santen and Gesinus Diemer, Eindhoven, Netherlands, assignors to North American Philips Company, Inc., New York, N.Y., a corporation of Delaware Filed Apr. 12, 1957, Ser. No. 652,429
Claims priority, application Netherlands May 16, 1956
12 Claims. (Cl. 250—213)

The invention relates to a device comprising a solid state image intensifier, connected to a voltage source, and to a solid-state image intensifier suitable for use in such a device.

A solid-state image intensifier is to be understood to mean an image screen comprising associated elements of an electro-luminescent substance (electro-luminescent elements) and elements of a photo-sensitive substance, of which the electrical impedance can be acted upon in a reversible manner by radiation (photo-sensitive elements), these elements being provided with electrodes to apply an electric voltage in a manner such that impedance variations produced by the radiation striking the photo-sensitive elements control the electric voltage across the associated electro-luminescent elements. Such an image screen can intensify or make visible a primary radiation image projected onto the photo-sensitive elements, since the impedance variations of the photo-sensitive material produced by the primary radiation control locally the electric voltage across the electro-luminescent material and hence the electro-luminescence thereof.

There is known a solid state image intensifier, in which the photosensitive elements and the electro-luminescent elements constitute each a separate layer. The associative relationship of the elements in the one layer with those of the other layer is obtained by arranging the two layers immediately one behind the other in the direction of thickness of the screen, if necessary with the interposition of an intermediate layer screening off the electro-luminescent light, and by providing electrodes constituted by conductive surfaces, for example of tin oxide, which are pervious to the radiation, and arranged one on each side of the layer structure.

This construction has not been found to be suitable for intensifying visible primary radiation. Since the conventional photo-sensitive substances, for example cadmium sulphide, have, for the major part, a high absorption coefficient in the visible spectrum, the thickness of the photo-sensitive layer must, in such cases, not be more than a few tens of microns, since otherwise the radiation to be reacted upon cannot traverse this layer. However, such a small thickness of the photo-sensitive layer results in that the ratio between the electric impedance of a non-irradiated photo-sensitive element (dark impedance) and the associated electro-luminescent element, which ratio in these known image intensifiers must be high in order to permit a satisfactory control of the electro-luminescence, assumes an unfavourable low value. The dark impedance of a photo-sensitive element is determined by the specific dark resistance of the photo-sensitive substance and by the geometry of the element. The latter is a measure not only for the dark resistance but also for the capacity of the element, which is of importance when applying alternating current to the image screen. The aforesaid desired small thickness of the photo-sensitive layer has the effect that the capacity of the layer is high and the dark resistance is low as compared with that of the electro-luminescent layer of a required thickness of 25 to 100$\mu$, which effect reduces the serviceability of the image screen.

The invention provides an arrangement by which the adverse effect of the photo-sensitive elements can be suppressed for a large part, if not completely. The arrangement in accordance with the invention permits of using a photo-sensitive substance having a comparatively low dark resistance.

The device according to the invention has the feature that the solid state image intensifier comprises non-photo-sensitive, impedance elements, which are associated with the electro-luminescent elements and which are also provided with an electrode and that the elements of each group of an electro-luminescent element with the associated elements are connected to one another and to the voltage source respectively in a manner such that such a group constitutes a differential or a bridge connection or circuit, the electro-luminescent element lying in the central arm or branch.

The central arm is to be understood to mean herein the arm interconnecting points whose potentials lie between those of the points having the highest potential difference. The term "central" should therefore not be taken literally. Neither is it meant that, in the non-irradiated state of the photo-sensitive elements, the arrangements should have to be such that the voltage across the electro-luminescent elements should be completely compensated, i.e. substantially zero.

The photo-sensitive elements and the non-photo-sensitive elements are preferably proportioned such that in the non-irradiated state the impedance of these two kinds of elements is substantially the same.

The device according to the invention permits of ensuring that, irrespective of the value of the dark impedance of the photo-sensitive elements, the partial voltage occurring across an electro-luminescent element in the non-irradiated state of the intensifier is an arbitrary small part of the total voltage applied. This permits of using, in the solid-state image-intensifier of the device, photo-sensitive substances having a comparatively high dark conductivity, while also the capacity of the photo-sensitive elements may be comparatively high.

The non-photo-sensitive or fixed-impedance elements of the solid-state image intensifier may be made from a substance which is in itself not or hardly photo-sensitive. However, it is often more simple to use the same substance for these elements as that of the photo-sensitive elements and to provide them with means protecting them against the radiation, preventing them from being acted upon by the radiation to be reacted upon by the intensifier.

In an advantageous embodiment of a solid-state image intensifier suitable for use in the device according to the invention, the photo-sensitive and the non-photo-sensitive elements together constitute a layer which lies on one side of the electro-luminescent elements also united in a layer, the latter layer being provided on the other side with an electrode extending substantially over the entire layer, a plurality of relatively insulated auxiliary electrode elements being provided between the two layers, and each of these electrode elements being associated with a photo-sensitive and an adjacent, non-photo-sensitive element, while furthermore the electrodes of the photosensitive elements, like those of the non-photo-sensitive elements, which electrodes are arranged on the side remote from the electro-luminescent layer, are electrically interconnected.

In order to obtain a device according to the invention with the aforesaid embodiment of a solid-state image intensifier, the group-wise interconnected electrodes of the photo-sensitive and of the non-photo-sensitive elements are connected to the terminals of a voltage source and the uninterrupted electrode on the electro-luminescent layer is connected to a point whose potential lies between those of the aforesaid electrodes. This potential is chosen to be such that, in the non-irradiated state of the photo-sensitive elements, the electro-luminescent layer luminesces to a hardly visible extent and the voltage across this layer increases during the irradiation of the photo-sensitive elements.

The voltage can be applied automatically to the uninterrupted electrode on the electro-luminescent layer by applying, in accordance with the invention, to the uninterrupted electrode on the electro-luminescent layer of the aforesaid advantageous embodiment of the solid-state image intensifier, a transparent impedance layer, of which the side remote from the electro-luminescent layer is provided with two separate, transparent electrodes, of which one is connected electrically to the inter-connected electrodes of the photo-sensitive elements and the other is connected electrically to the inter-connected electrodes of the non-photo-sensitive elements.

In the solid-state image intensifier suitable for use in the device according to the invention, the photo-sensitive and the non-photo-sensitive elements are preferably provided in the shape of locally parallel paths, which alternate in the direction transverse to these paths and in the plane thereof.

A further embodiment of the solid-state image intensifier exhibits locally parallel paths lying substantially in the same plane and being alternately photo-sensitive, non-photo-sensitive and electro-luminescent, the electro-luminescent paths on one side of the layer being provided each with an electrode connected electrically to the other and on the other side of the layer with a plurality of separate, relatively insulated auxiliary electrode elements, the latter elements extending each on both sides of the associated electro-luminescent path across the edge of the adjacent photo-sensitive path and the non-photo-sensitive path, while adjacent photo-sensitive paths and non-photo-sensitive paths are provided, on the same side of the layer where the auxiliary electrode elements are provided, with common electrodes extending in the direction of the paths, these electrodes being alternately connected to one another.

The invention will now be described more fully with reference to the drawing, which shows a few embodiments.

It should be noted that for the sake of clarity various dimensions in the figures are not shown in the correct relative ratio. More particularly, the thickness of the electrodes and of the opaque layers used for screening is shown on a greatly enlarged scale. Also the thickness of the photo-sensitive elements, as compared with that of the electro-luminescent elements, is, in general, excessively large.

Figure 1:
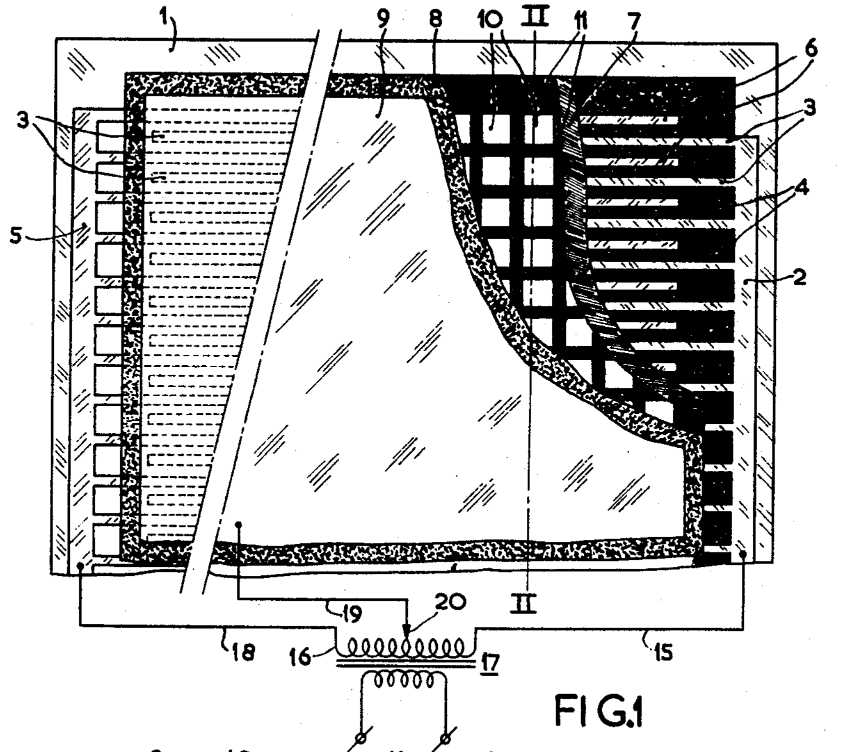
Fig. 1 shows diagrammatically part of a plan view of a first embodiment of the device according to the invention, in which various successive layers of the solid-state image intensifier employed herein are broken away.
Figure 2:
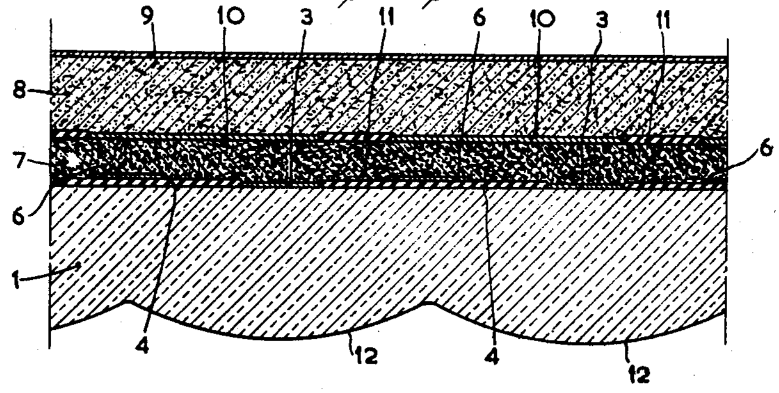
Fig. 2 shows diagrammatically part of the cross section taken on the line II—II of the solid-state image intensifier shown in Fig. 1.

In the device shown in Figs. 1 and 2 a transparent supporting plate 1, which may be made of glass or a synthetic substance, is provided with a comb-shaped electrode 2 with parallel teeth 3. The electrode 2 consists of a transparent layer of conductive tin oxide. The teeth 3 have each a width of about 300$\mu$ and the central distance of successive teeth is 1200 to 2000$\mu$. The supporting plate 1 is furthermore provided with opaque paths 4 of insulating material, covering the spaces between the teeth 3. The paths 4 may, for example, consist of a black lacquer and may have a thickness of for example 5$\mu$.

In the centre of the opaque paths 4 are provided the teeth 6 of a second comb-shaped electrode 5. The teeth 6 have the same width and central distance as the teeth of the electrode 2 and are located over the spaces between the latter. The projection of the electrodes 2 and 5 onto a plane parallel to the supporting plate 1 thus constitute interlaced patterns which do not intersect. The teeth of the electrodes 2 and 5 need not form straight lines, they may follow wavy lines or zigzag lines. It is essential that they should be locally parallel. The cross-section shown in Fig. 2 is a section which is locally at right angles to the direction of the electrodes. Instead of being comb-shaped, the electrodes 2 and 5 and hence also the opaque paths 4 may be concentric spirals.

The teeth of the electrodes and the opaque paths 4 are covered by a photo-sensitive, variable-impedance layer 7, which consists mainly of a substance whose specific electrical impedance can be varied in a reversible manner by irradiation. The layer 7 has a thickness of 10 to 20$\mu$ and may consist for example of cadmium sulphide activated with copper and gallium. On top of the photo-sensitive layer 7 is, with the interposition of relatively insulated, substantially square auxiliary electrode elements 10, applied a layer 8, this layer mainly comprising an electro-luminescent substance if necessary together with a binder, for example urea formaldehyde. The electro-luminescent substance may be for example copper- and aluminum-activated zinc sulphide. The thickness of the electro-luminescent layer 8 may be for example 75$\mu$. On the side remote from the supporting plate 1, the layer 8 is provided with an uninterrupted, transparent electrode 9, which may be formed, for example, by a very thin metal layer.

The auxiliary electrode elements 10, which serve as current diffusers, between the photo-sensitive layer 7 and the electro-luminescent layer 8 are each located opposite two adjacent teeth of the two comb-shaped electrodes 2 and 5. These auxiliary electrode elements have a good electrical conductivity and may consist, for example, of metal or conductive tin oxide. It is not necessary, and even often undesirable that the auxiliary electrode elements should be pervious to the electro-luminescent radiation produced in the layer 8; they may therefore have a comparatively large thickness, for example, of 5$\mu$.

In order to prevent a reaction of the electro-luminescent radiation produced in the layer 8 on the photo-sensitive layer 7 via the apertures between the auxiliary electrode elements 10, these interstices are covered by an opaque, insulating material 11, for example, black lacquer. This material may, as an alternative, be applied in the form of an uninterrupted layer of for example 5$\mu$ in thickness between the electro-luminescent layer 8 and the photo-sensitive layer 7 with the auxiliary electrode elements 10. In such a case the auxiliary electrode elements 10 need not be opaque. The electrode 2 is connected via a conductor 15 to one end of the secondary winding 16 of an output transformer 17 of an alternating-voltage generator (not shown). The other end of the secondary winding is connected via a conductor 18 to the electrode 5. The electrode layer 9 on the electro-luminescent layer 8 is connected via a conductor 19 to an adjustable tapping 20 on the secondary winding 16.

The supporting plate 1 with the applied layers and electrodes constitutes an image screen, which consists, in fact, of an assembly of electro-luminescent elements, each of which has associated therewith a photo-sensitive and a non-photo-sensitive element. The paths of the electro-luminescent layer 8 located between an auxiliary electrode element 10 and the opposite part of the electrode layer 9 constitute, each time, one electro-luminescent element. The photo-sensitive element and the non-photo-sensitive element associated with such an electro-luminescent element are formed by the part of the photo-sensitive layer 7 located between the auxiliary electrode element 10 concerned and the opposite part of an electrode tooth 3 and an electrode tooth 6 respectively.

Figure 3:
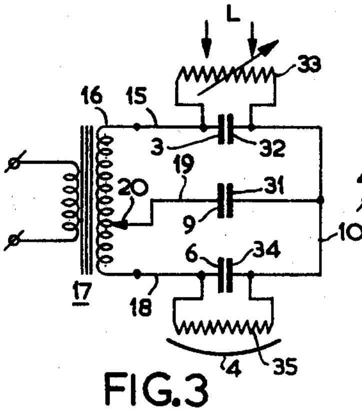
Fig. 3 shows the equivalent electric circuit diagram of a group of associated elements of the solid-state image intensifier of the device shown in Fig. 1.

Fig. 3 shows the electrical arrangement of a group of associated elements. This arrangement is identical for each group. An electro-luminescent element is represented by the capacitor 31, the associated photo-sensitive element by the capacitor 32 with a parallel-connected resistor 33, the value of which varies with the intensity of the radiation L projected onto the part concerned of the electrode 2 through the supporting plate 1. The associated, non-photo-sensitive element is represented in Fig. 3 by the capacitor 34 with a parallel-connected resistor 35, which has an invariable value owing to the screening of the paths 4. The electrodes of the capacitors in the circuit diagram and their connections are designated by the reference numerals used in the Figs. 1 and 2 for the corresponding electrodes and conductors.

It is evident from the arrangement shown in Fig. 3 that the associated elements constitute a differential or bridge circuit, the electro-luminescent element (capacitor 31) lying in the central branch. The capacitors 32 and 34 will, usually, be of equal value and, in the non-irradiated state, also the resistors 33 and 35 will be substantially identical. In the non-irradiated state, therefore, the voltage across the capacitor 31 is determined as a first approximation by the value of the voltage across the secondary winding 16 and by the position of the tapping 20, connected to the electrode 9, i.e. independently of the value of the capacity and of the dark resistance of the photo-sensitive element. It is efficient to adjust the tapping 20 to such an extent out of the centre in the direction of the end of the secondary winding 16 connected to the conductor 18 that, in the non-irradiated state, the electro-luminescent element is at the limit of visible electro-luminescence. When the image screen is irradiated through the supporting plate 1, the resistor 33 of each of the photo-sensitive elements varies with the local intensity of this radiation L. Thus, the electrical voltage across the associated electro-luminescent elements increases in accordance with the variation in the resistors 33 concerned. A radiation image projected onto the image screen through the support 1 thus produces an electro-luminescence in the layer 8 in accordance with the pattern of this radiation image. The definition of the electro-luminescent image is determined by the dimensions of the auxiliary electrode elements 10. For this reason the dimension of these elements in the direction of the teeth of the electrodes 2 and 5 is chosen to be at the most equal to the dimension at right angles thereto.

Since only those parts of the photo-sensitive layer 7 can respond to a radiation which are not covered by an opaque path 4 it is efficient to concentrate the radiation to be reacted upon as much as possible on the transparent teeth 3 of the electrode 2. To this end the supporting plate 1 may be profiled in a manner such that a lens effect is obtained which produces such a concentration. In the device shown in Fig. 1 the supporting plate 1 is provided with a plurality of cylindrical surfaces 12, extending in the direction of the teeth of the electrode 2 and being symmetrical to the latter.

Figure 4:
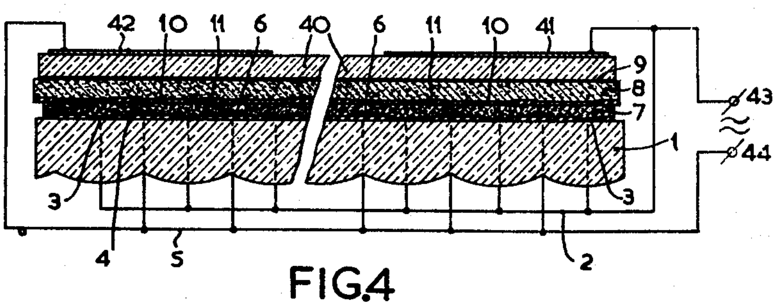

The solid-state image intensifier, shown in Fig. 4 in a diagrammatical cross-section, is constructed for a large part in the same manner as that shown in Figs. 1 and 2. For corresponding parts the same reference numerals are employed. The image screen differs from that shown in Figs. 1 and 2 by the addition of a fixed impedance layer 40, which is provided with two separate, transparent electrodes 41 and 42. The impedance layer 40, which engages the electrode layer 9, is transparent and may, for example, be made of glass or a synthetic substance, having a thickness of for example 100$\mu$. The electrodes 41 and 42, which may be made for example of conductive tin oxide, cover each a large part of the surface of the layer 40, remote from the electro-luminescent layer. The electrode 41 is electrically connected to the electrode 2, which is provided with a connecting terminal 43, and the electrode 42 is electrically connected to the electrode 5, which is provided with a connecting terminal 44. The plate 40 constitutes, together with the electrodes 41 and 42 and the electrode layer 9, a capacitative potentiometer for the alternating voltage to be applied to the terminals 43 and 44, so that the electrode layer 9 obtains a potential which lies between those of the electrodes 2 and 5.

Figure 5:
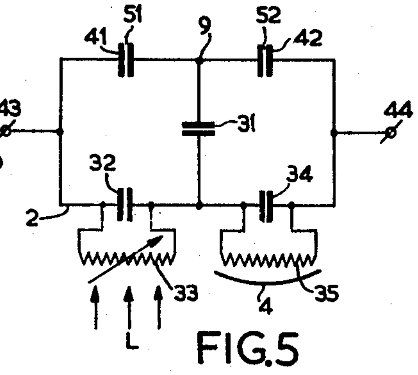
Fig. 4 shows diagrammatically in cross-section the solid-substance image intensifier and the electric connections thereof in a further embodiment of the device according to the invention and Fig. 5 shows the equivalent electric circuit diagram of a group of associated elements of the device shown in Fig. 4.

Fig. 5 shows the circuit diagram of a group of associated elements of the image screen shown in Fig. 4. It is evident from this diagram that the capacities and resistances of the photo-sensitive and non-photo-sensitive elements, associated with an electro-luminescent element (the same reference numerals as those of Fig. 3), together with the capacities 51 and 52, formed by the electrode layer 9 with the electrode 41 and the electrode 42, constitute a bridge circuit, the electro-luminescent element (capacitor 31) lying in the diagonal. It is efficient to choose the size of the electrode 42 to be slightly larger than that of the electrode 41, so that in the non-irradiated state a certain voltage prevails across the electro-luminescent elements, which are thus at the limit of visible electro-luminescence.

Figure 6:
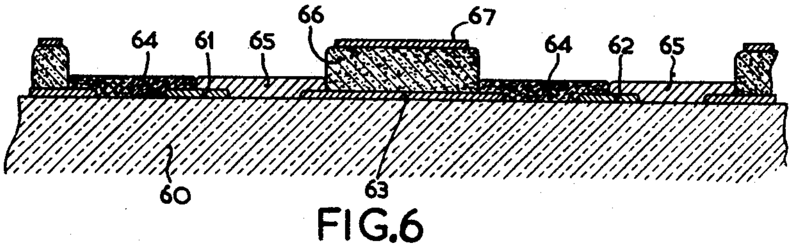
Fig. 6 shows diagrammatically part of the cross-section of a solid-state image intensifier suitable for use in the device according to the invention, in which the various elements lie substantially in the same plane.

Fig. 6 shows, in a cross section, part of a solid state image intensifier, in which the various elements lie substantially in the same plane.

On a supporting plate 60, which is transparent, are provided, two equal-spaced, strip-shaped electrodes 61 and 62, extending transversely to the plane of the drawing, which electrodes alternate. The electrodes 61 and also the electrodes 62 are interconnected, for example, by forming as part of a comb-shaped electrode corresponding to the electrodes 2 and 5 of the solid-state image intensifier shown in Figs. 1 and 2.

In the centre between each pair of adjacent electrodes 61 and 62 is provided a series of separate auxiliary electrode elements 63, which have the same dimension at right angles to the plane of the drawing as in this plane. The spaces between the said electrodes and the series of auxiliary electrode elements are alternately covered with a path 64 of a photo-sensitive substance and a path 65 of a non-photo-sensitive substance. The paths 64 and 65 overlap each time a common electrode 61 or 62 and the edge of the adjacent series of auxiliary electrode elements 63. The paths 64 may be made of photo-sensitive cadmium sulphide and the paths 65 may be made for example of non-photo-sensitive cadmium sulphide, for example cadmium sulphide with an excess of copper.

To each series of auxiliary electrode elements 63 is applied an electro-luminescent path 66 transversely to the plane of the drawing, this path being provided, on the side remote from the supporting plate, with a transparent electrode 67. The electrodes 67 of the various electro-luminescent paths are electrically interconnected. This may be obtained, for example, by shaping the common electrodes 67 and the electrodes 61 and 62 in the form of a comb. As an alternative, the electrodes 67 may be electrically interconnected by applying thereto a transparent plate, having a conductive surface, for example of conductive tin oxide.

In order to operate the solid-state image intensifier described above, the electrodes 61 and 62 are connected to the terminals of a voltage source, for example, the output transformer of an alternating-voltage generator, while the electrodes 67 are connected, in common, to a point whose potential lies between those of the points to which the electrodes 61 and 62 are connected. Each group of associated elements then constitutes, as in the embodiment shown in Figs. 1, 2 and 3 a differential circuit, the electro-luminescent element lying in the central branch. The electro-luminescent element of such a group is constituted by the part of an electro-luminescent path 66 between an auxiliary electrode element 63 and the opposite part of the electrode 67. The photo-sensitive element associated with this electro-luminescent element is constituted by that part of the adjacent photo-sensitive path 64 which covers the edge of the auxiliary electrode element 63 concerned. The associated non-photo-sensitive element is constituted by that part of the non-photo-sensitive path 65 lying on the other side of the electro-luminescent path concerned which covers the opposite edge of the auxiliary electrode element.

When irradiating the image screen described above through the supporting plate 60 by a radiation affecting the specific impedance of the photo-sensitive substance in the paths 64, first the surface of the photo-sensitive paths engaging the supporting plate 60 and forming a current path, is acted upon. The thickness of the paths 64 is therefore of secondary importance. The resistance variations of the said current path become manifest in an increase in the voltage across the associated electro-luminescent element, of which the electro-luminescence emerges through the electrode 67. If the auxiliary electrode elements 63 are transparent, for example, if they are made of conductive tin oxide, the electro-luminescent is perceptible through the supporting plate 60. The image intensified and/or made visible by the image screen is then also visible from the side of the incident primary image.

What is claimed is:

1. A solid-state image-intensifying device comprising an electro-luminescent element, a radiation-receiving, photo-sensitive, variable-impedance element, a fixed-impedance element, a source of potential including terminals providing a given voltage difference and means furnishing a voltage at a value below the said voltage difference, means connecting the variable-impedance and fixed-impedance elements in series across the terminals providing the given voltage difference, and means connecting the electro-luminescent element between the means furnishing the voltage at said lower value and the junction of the variable-impedance and fixed-impedance elements, whereby the elements form a bridge circuit with the electro-luminescent element in the central branch.

2. A device as set forth in claim 1 wherein, in the absence of impinging radiation, the impedances of the variable-impedance and fixed impedance elements are about the same.

3. A device as set forth in claim 2, wherein the lower voltage has a value at which, in the absence of impinging radiation, the electroluminescent element just barely glows.

4. A solid-state image-intensifying device comprising a layer of electro-luminescent material, a continuous transparent electrode contacting one side of the electro-luminescent layer, a layer of adjacent photo-sensitive, variable-impedance and fixed-impedance elements arranged adjacent the other side of the electro-luminescent layer, plural insulated auxiliary electrodes arranged between the electro-luminescent and the impedance layers each associated with a variable-impedance and a fixed-impedance element, electrodes coupled to the variable-impedance elements, electrodes coupled to the fixed-impedance elements, means establishing a given potential difference across the electrodes coupled to the variable-impedance and fixed-impedance elements, means providing an intermediate value of potential, and means coupling the last-named means to the continuous transparent electrode whereby the impedance elements together with elemental portions of the electro-luminescent layer form a bridge circuit with the electro-luminescent element lying in the central branch.

5. A device as set forth in claim 4 wherein a transparent impedance layer is mounted on the transparent electrode, a pair of transparent electrodes are provided contacting spaced portions of the impedance layer, and means are provided connecting one of said pair of transparent electrodes to the electrodes coupled to the variable-impedance elements and the other of said pair of transparent electrodes to the electrodes coupled to the fixed-impedance elements, and connecting the two last-named connections to terminals of an alternating-current voltage source.

6. A solid-state image-intensifying device comprising a layer of electro-luminescent material, a continuous transparent electrode contacting one surface of the electro-luminescent layer, a layer of photo-sensitive material arranged adjacent the electro-luminescent layer, plural insulated auxiliary electrodes arranged between and contacting elemental portions of the electro-luminescent and photo-sensitive layers, radiation-opaque means contacting portions of each photo-sensitive layer portion contacted by an auxiliary electrode and thus preventing impingement of incident radiation thereon to form fixed-impedance elements, but leaving exposed to impinging radiation others of the photo-sensitive layer portions to form variable-impedance elements, one group of connected electrodes coupled to the variable-impedance elements, another group of connected electrodes coupled to the fixed-impedance elements, means connecting the two groups of electrodes to terminals of an alternating-current voltage source, and means connecting the transparent electrode to a terminal of said voltage source producing an intermediate value of voltage whereby the various elements form a bridge circuit with the electro-luminescent element lying in the central branch.

7. A device as set forth in claim 6 wherein a lenticular element is disposed adjacent the photo-sensitive layer so as to focus impinging radiation on the variable-impedance elements.

8. A device as set forth in claim 7 wherein the lenticular element comprises a transparent support member having a plural-cylindrical cross-section adapted to focus incident radiation on the variable-impedance elements.

9. A device as set forth in claim 6 wherein the two groups of electrodes are locally parallel to one another and arranged in alternating sequence.

10. A solid-state image-intensifying device comprising, arranged in a common plane and alternating with one another in a regular array, plural electro-luminescent elements, plural photo-sensitive, variable-impedance elements and plural fixed-impedance elements, plural interconnected electrodes contacting one side of the electro-luminescent elements, plural insulated auxiliary electrodes contacting the opposite side of the electro-luminescent elements and contacting portions of the adjacent variable-impedance and fixed-impedance elements, alternately-connected electrodes coupled to adjacent variable-impedance and fixed-impedance elements, means for establishing a given potential difference across the alternately-connected electrodes, means for establishing an intermediate value of potential, and means coupling the last-named means to the electrodes contacting one side of the electro-luminescent elements, whereby the various electrodes form a bridge circuit with the electro-luminescent element lying in the central branch.

11. A device as set forth in claim 10 wherein the plural electrodes and elements are locally parallel to one another.

12. A device as set forth in claim 11 wherein the auxiliary electrodes each have a dimension in the said parallel direction not greater than dimensions transverse thereto.

References Cited in the file of this patent

UNITED STATES PATENTS

| | | |
|---|---|---|
| 2,773,992 | Ullery | Dec. 11, 1956 |
| 2,792,447 | Kazan | May 14, 1957 |
| 2,839,690 | Kazan | June 17, 1958 |

UNITED STATES PATENT OFFICE

CERTIFICATION OF CORRECTION

Patent No. 2,948,816 August 9, 1960

Johannes Gerrit van Santen et al.

It is hereby certified that error appears in the above numbered patent requiring correction and that the said Letters Patent should read as corrected below.

Column 5, line 11, for "paths" read -- parts --.

Signed and sealed this 11th day of July 1961.

(SEAL)
Attest:

ERNEST W. SWIDER
Attesting Officer

DAVID L. LADD
Commissioner of Patents